July 24, 1956
R. E. MELOY
2,756,089
BASKET HANDLE
Filed May 19, 1953
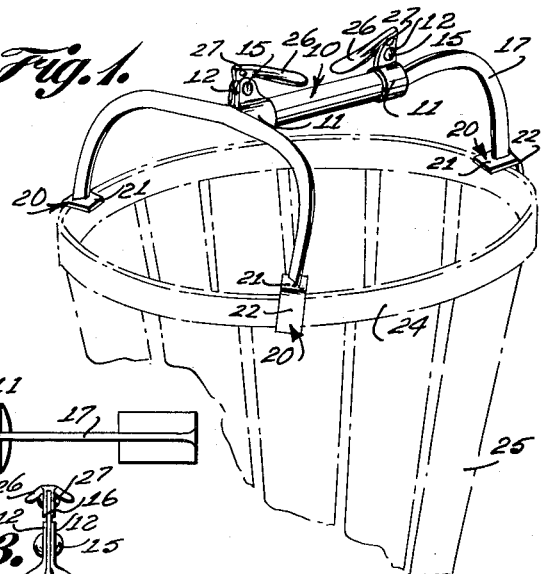
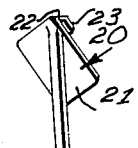
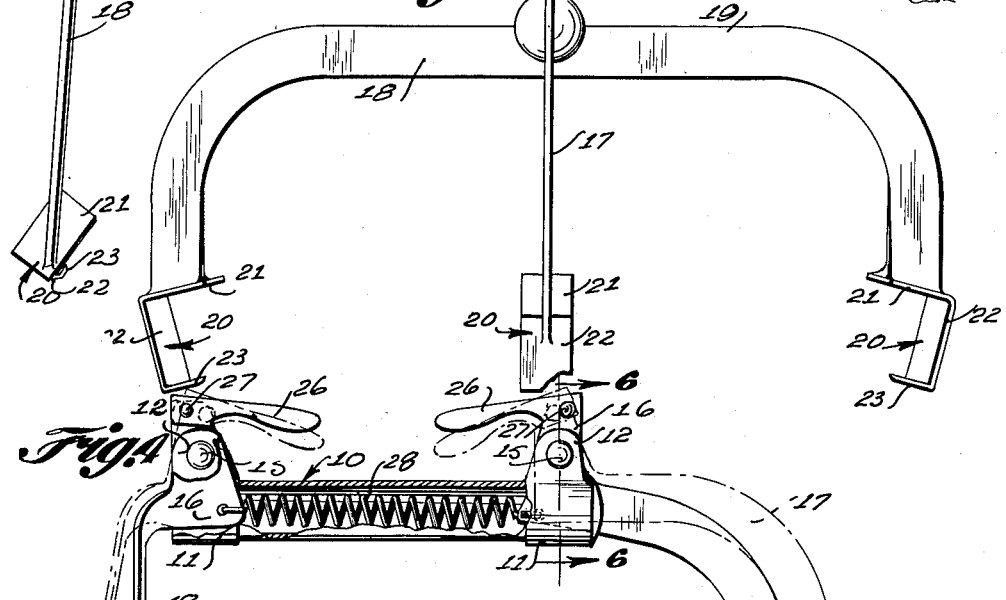
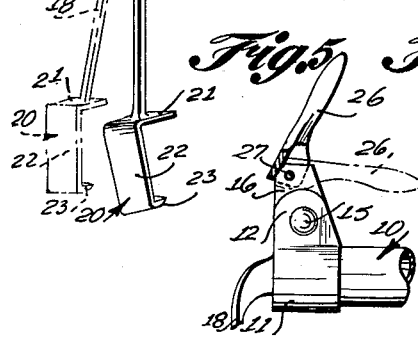
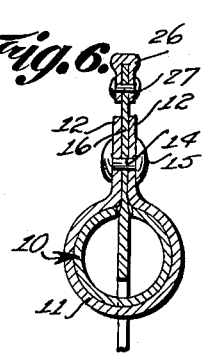
INVENTOR.
Robert E. Meloy
BY Victor J. Evans & Co.
ATTORNEYS

United States Patent Office 2,756,089
Patented July 24, 1956

2,756,089
BASKET HANDLE
Robert E. Meloy, Pottstown, Pa.

Application May 19, 1953, Serial No. 356,009

2 Claims. (Cl. 294—31)

This invention relates to a handle, and more particularly to a handle for a basket.

The object of the invention is to provide a handle which can be readily attached to or detached from a basket so as to facilitate the carrying of the basket.

Another object of the invention is to provide a basket handle which includes a resilient means for normally urging the jaws into engagement with the basket so as to prevent accidental disengagement of the handle from the basket, the handle of the present invention permitting heavy loads to be carried with greater ease and simplicity.

A further object of the invention is to provide a basket handle which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a perspective view showing the handle attached to a basket.

Figure 2 is a top plan view of the basket handle of the present invention.

Figure 3 is a side elevational view of the basket handle.

Figure 4 is an elevational view of the basket handle, with parts broken away in section.

Figure 5 is a fragmentary sectional view showing one of the pivotally mounted levers or hand grips.

Figure 6 is a sectional view taken on the line 6—6 of Figure 4.

Referring in detail to the drawings, the numeral 10 designates a tubular housing or hand grip which may be made of any suitable material such as metal, and mounted on each end of the housing 10 is a sleeve 11. Each of the sleeves 11 terminates in an upwardly extending pair of spaced parallel apertured ears 12, Figure 6, and each of the ears 12 is provided with a registering opening 14 whereby a suitable securing element such as a pivot pin 15 can extend through these openings. A plate 16 is pivotally mounted between each of the pair of ears 12, the plate 16 being pivotally mounted on the pin 15. The lower portion of each of the plates 16 extends through a slot 13 in the housing 10.

Extending from the plate 16 on one end of the housing 10 is a curved jaw 17, while extending from the plate 16 on the other end of the housing 10 is a pair of curved jaws 18 and 19, Figure 1. The lower end of each of the jaws 17, 18 and 19 is provided with a lug 20 which is adapted to engage the upper rim 24 of a conventional basket 25. Thus, with the lugs 20 arranged in engagement with the rim 24 of the basket, a person can readily grip the housing or handle 10 so as to carry the basket from place to place even though it may be heavily loaded.

Each of the basket engaging lugs 20 has the same construction and each includes an upper section 21, a straight section 22, and a bottom section 23, Figure 3.

Pivotally connected to the upper end of each of the plates 16 is a lever or hand grip 26, Figure 5, the levers 26 being pivotally connected to the plates 16 by a pivot pin 27. Thus, the levers 26 may be pivoted upward to the position shown in Figure 5 so as to provide sufficient clearance for the person to wrap his or her hand around the housing 10. A coil spring 28 is positioned within the housing 10, and the coil spring 28 has its ends connected to the plates 16 for urging the lugs 20 into automatic engagement with the basket rim 24. However, when it is desired to disengage the handle from the basket, it is only necessary to manually depress the levers 26 downward toward the housing 10 whereby the jaws 17, 18 and 19 will be pivoted about the pins 15 so that the lugs 20 will move out of engagement with the basket rim 24 whereby the handle can be removed.

From the foregoing it is apparent that a handle has been provided which will facilitate the carrying of baskets such as the the basket 25. In use to apply the handle to the basket, it is only necessary to manually depress the levers 26 so that the levers 26 move from the position shown in solid lines in Figure 4 to the position shown in dotted lines. This causes the jaws 17, 18 and 19 to move outwardly whereby the device can be placed over a basket as shown in Figure 1, and then when manual downward pressure on the levers 26 is released, the coil spring 28 will pull the plate 16 towards each other whereby the jaws 17 and the jaws 18 and 19 will move toward each other to cause the lugs 20 to engage and clamp on the basket rim 24. The coil spring 28 will maintain the handle tightly clamped on the basket so that accidental disengagement of the handle from the basket will be prevented. Further, the levers 26 may be pivoted upward from the dotted line position shown in Figure 5 to the solid line position so as to provide sufficient room or space on the housing 10 for the person's hand.

I claim:

1. A basket handle comprising a tubular housing adapted to be gripped in the handle, a sleeve mounted on each end of said housing and providing a pair of upstanding apertured ears, a plate pivotally mounted between each of said ears, a coil spring interconnecting said plates together, a hand grip pivotally connected to each of said plates, curved jaws extending from said plates, and lugs mounted on the lower end of each of said jaws for movement into and out of engagement with a rim of a basket.

2. In a basket handle, a tubular housing adapted to be gripped in the hand, a sleeve on each end of said housing and providing a pair of upstanding spaced parallel apertured ears, a pin extending between said pair of ears, a plate pivotally mounted on each pin between each of said ears, there being slots in said housing for receiving the lower portion of said plates, a coil spring interconnecting said plates together, a hand grip pivotally connected to each of said plates, a first curved jaw extending from one of said plates, a pair of divergent jaws extending from the other of said plate, and lugs mounted on the lower end of each of said jaws for movement into and out of engagement with a rim of a basket, each of said lugs including an upper section, a straight section and a bottom section, said hand grips adapted to be pivoted to an upper position to provide clearance for the person's hand on the housing.

References Cited in the file of this patent

UNITED STATES PATENTS 1,752,143     Bishman _____ Mar. 25, 1930

FOREIGN PATENTS 362,656     Germany _____ Oct. 30, 1922